(12) United States Patent
Yoshikawa (10) Patent No.: US 12,073,270 B2
(45) Date of Patent: Aug. 27, 2024

(54) PRINTING APPARATUS AND METHOD OF CONTROLLING PRINTING APPARATUS FOR CHANGING PRINTING CONDITION

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/820,378

(22) Filed: Aug. 17, 2022

(65) Prior Publication Data

US 2023/0056603 A1 Feb. 23, 2023

(30) Foreign Application Priority Data

Aug. 19, 2021 (JP) .................................. 2021-133901

(51) Int. Cl.
*G06K 15/02* (2006.01)
*B41J 29/19* (2006.01)
*B41J 29/393* (2006.01)
*G06K 15/00* (2006.01)

(52) U.S. Cl.
CPC ............ *G06K 15/025* (2013.01); *B41J 29/19* (2013.01); *B41J 29/393* (2013.01); *G06K 15/005* (2013.01); *B41J 2203/01* (2020.08)

(58) Field of Classification Search
None
See application file for complete search history.

(56) References Cited

U.S. PATENT DOCUMENTS

| | | | |
|---|---|---|---|
| 2013/0063646 A1* | 3/2013 | Ueno | G06F 1/1616 348/333.1 |
| 2016/0107468 A1* | 4/2016 | Leynadier | B41J 11/008 347/16 |
| 2017/0282594 A1* | 10/2017 | Akao | B41J 3/40731 |
| 2018/0005606 A1* | 1/2018 | Mori | G09G 3/3413 |
| 2018/0343426 A1* | 11/2018 | Wada | G09G 5/32 |
| 2019/0155128 A1* | 5/2019 | Shimizu | G02B 7/10 |

FOREIGN PATENT DOCUMENTS

JP 2015184933 A * 10/2015
JP 2017-177578 A 10/2017

* cited by examiner

*Primary Examiner* — Akwasi M Sarpong
*Assistant Examiner* — Pawan Dhingra
(74) *Attorney, Agent, or Firm* — Global IP Counselors, LLP (57) ABSTRACT

A printing apparatus includes a printing unit configured to perform printing on a recording target, a projection unit configured to project a printing sample image onto the recording target, a detection unit configured to detect a user operation within a projection area into which the projection unit is configured to perform projection, and a control unit configured to control the printing unit based on a printing condition, wherein the control unit changes the printing condition, based on the user operation that is detected by the detection unit.

10 Claims, 5 Drawing Sheets

PRINTING APPARATUS AND METHOD OF CONTROLLING PRINTING APPARATUS FOR CHANGING PRINTING CONDITION

The present application is based on, and claims priority from JP Application Serial Number 2021-133901, filed Aug. 19, 2021, the disclosure of which is hereby incorporated by reference herein in its entirety.

BACKGROUND

1. Technical Field

The present disclosure relates to a printing apparatus and a method of controlling the printing apparatus.

2. Related Art

Hitherto, as disclosed in JP-A-2017-177578, there has been known an apparatus that performs printing by detecting a position detection mark provided to a printing jig and changing print data.

However, for the apparatus described in JP-A-2017-177578, a user is not allowed to easily change a printing condition for the print data.

SUMMARY

Provided is a printing apparatus including a printing unit configured to perform printing on a recording target, a projection unit configured to project a printing sample image onto the recording target, a detection unit configured to detect a user operation within a projection area into which the projection unit is configured to perform projection, and a control unit configured to control the printing unit based on a printing condition, wherein the control unit changes the printing condition, based on the user operation that is detected by the detection unit.

Provided is a method of controlling a printing apparatus, the printing apparatus including a printing unit configured to perform printing on a recording target based on a printing condition, a projection unit configured to project a printing sample image onto the recording target, and a detection unit configured to detect a user operation within a projection area into which the projection unit is configured to perform projection, wherein the printing condition is changed based on the user operation that is detected by the detection unit.

DESCRIPTION OF EXEMPLARY EMBODIMENTS

Exemplary embodiments are described below with reference to the accompanying figures. Note that the directions in the drawings are described by using a three-dimensional coordinate system. For convenience of description, a positive direction of a Z axis is referred to as an upper direction or simply as upward and a negative direction thereof is referred to as a lower direction or simply as downward, a positive direction of a Y axis is referred to as a right direction or simply as rightward and a negative direction thereof is referred to as a left direction or simply as leftward, and a negative direction of an X axis is referred to as a front direction or simply as frontward and a positive direction thereof is referred to as a rear direction or simply as rearward.

1. Configuration of Printing Apparatus

Figure 1:
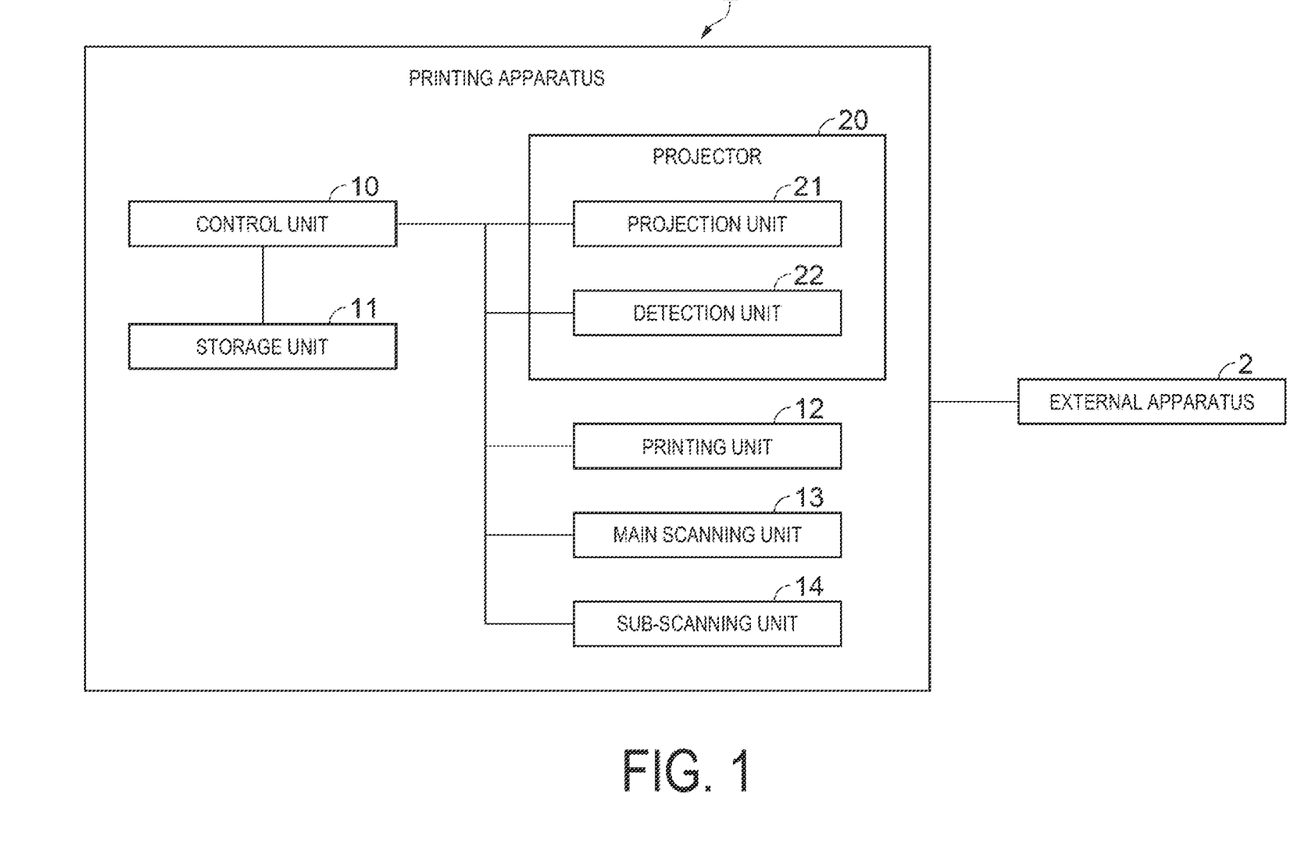
FIG. 1 is a block view illustrating a configuration of a printing apparatus according to an exemplary embodiment.

As illustrated in FIG. 1, a printing apparatus 1 is configured to include a control unit 10, a storage unit 11, a printing unit 12, a main scanning unit 13, a sub-scanning unit 14, and a projector 20. The projector 20 includes a projection unit 21 and a detection unit 22. Each of the units is specifically described also with reference to FIG. 2.

The control unit 10 illustrated in FIG. 1 is configured to include a Central Processing Unit (CPU) that collectively controls each of the units in the printing apparatus 1, a Universal Asynchronous Receiver Transmitter (UART) that manages input and output, and a logical circuit such as a Field Programmable Gate Array (FPGA) and a Programmable Logic Device (PLD). The CPU is also simply referred to as a processor.

The storage unit 11 is configured to include a flash Read Only Memory (ROM) being a re-writable non-volatile memory, a Hard Disk Drive (HDD), a Random Access Memory (RAM) being a volatile memory, and the like.

The CPU of the control unit 10 reads a program such as firmware stored in the non-volatile memory of the storage unit 11, and executes the program while using the RAM of the storage unit 11 as a working region.

Figure 2:
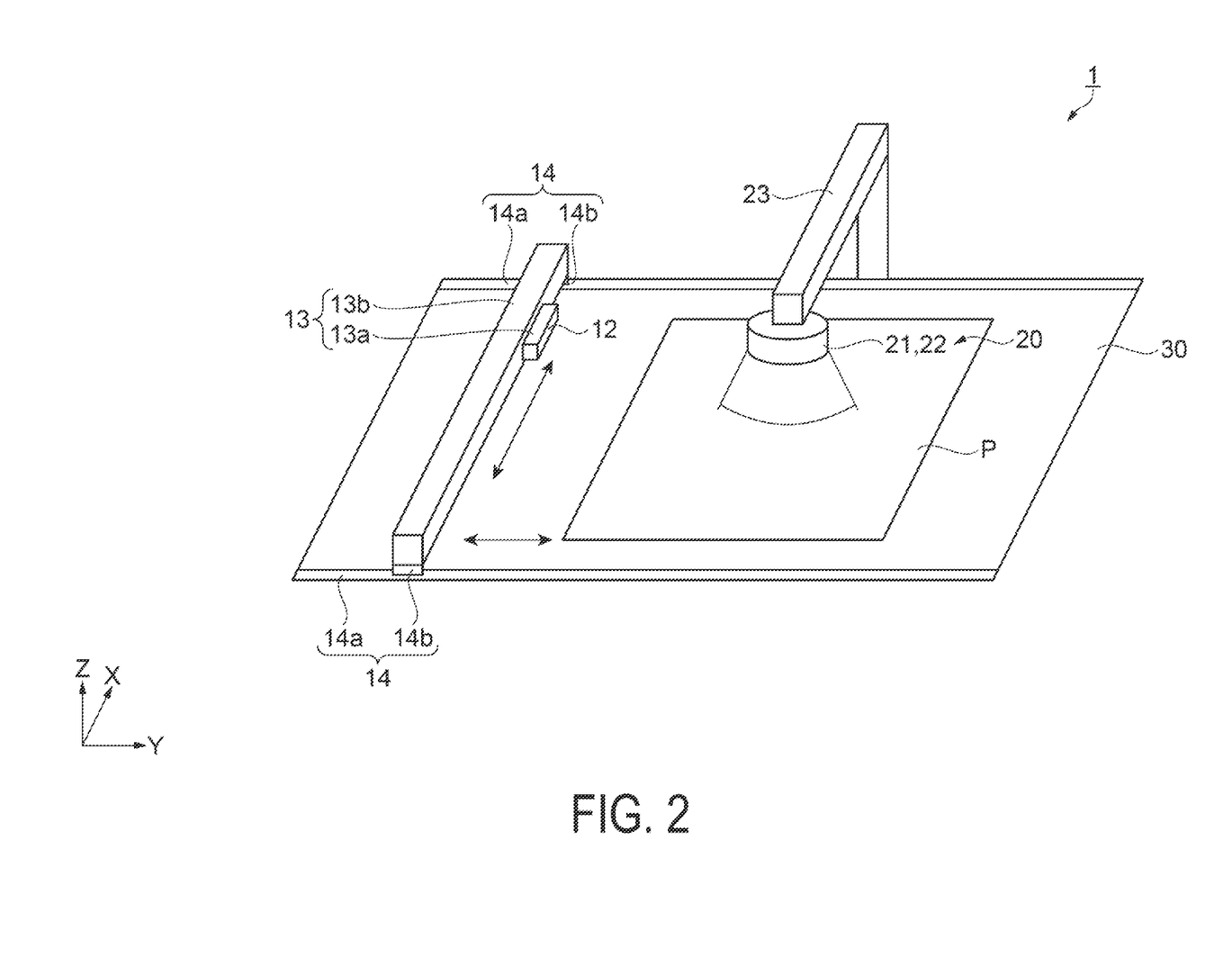
FIG. 2 is a schematic view illustrating the configuration of the printing apparatus according to the exemplary embodiment.

As an example, a recording target P illustrated in FIG. 2 may be a sheet-like material such as plain paper, synthetic paper, and a film, or may be a three-dimensional material, i.e., a resin such as plastic, metal such as iron, or wood. A user places the recording target P on a table 30.

The printing unit 12 includes an ink-jet type head. For example, ink ejected from the head of the printing unit 12 is so-called ultraviolet light curable ink. The ink contains color pigments such as Cyan, Magenta, Yellow, and Black (C, M, Y, and K), for example. The printing unit 12 also includes a supply mechanism that supplies the ink to the head.

As illustrated in FIG. 2, the printing apparatus 1 is a so-called flat-bed type apparatus capable of performing printing when the main scanning unit 13 and the sub-scanning unit 14 cause the printing unit 12 to scan the recording target P fixed on the table 30 in the front-and-rear direction and the right-and-left direction.

The main scanning unit 13 is configured to include a carriage 13a and a carriage shaft 13b. The carriage 13a carries the printing unit 12. The carriage shaft 13b is laid over the table 30 in the front-and-rear direction. The carriage shaft 13b supports the carriage 13a in a movable manner. The carriage 13a carries the printing unit 12, and is movable by a carriage motor in the front-and-rear direction along the carriage shaft 13b on the recording target P placed on the table 30.

The sub-scanning unit 14 is configured to include a slider 14b and a guide rail 14a at either end of the table 30 in the front-and-rear direction.

The guide rail 14a is formed of a groove extending in the table 30 in the right-and-left direction. The slider 14b has one end fixed to the carriage shaft 13b and the other end fitted into the groove of the guide rail 14a in a movable manner. The slider 14b is capable of moving the carriage shaft 13b in the right-and-left direction along the guide rail 14a, due to a slider motor.

The control unit 10 controls the main scanning unit 13, thereby moving the printing unit 12 in the front-and-rear direction, and controls the sub-scanning unit 14, thereby moving the printing unit 12 in the right-and-left direction through intermediation of the carriage shaft 13b. The scanning direction of the main scanning unit 13 and the scanning direction of the sub-scanning unit 14 are directions intersecting with each other.

The control unit 10 controls the main scanning unit 13 and the sub-scanning unit 14, thereby causing the printing unit 12 to scan the recording target P fixed on the table 30 in the front-and-rear direction and the right-and-left direction while the printing unit 12 ejects the ink. With this, printing can be performed.

For example, the projector 20 is a so-called interactive type including the projection unit 21 and the detection unit 22. The projector 20 is supported by a support unit 23 on the table 30. The projection unit 21 and the detection unit 22 of the projector 20 are positioned above the table 30. The projection unit 21 is capable of performing projection onto the table 30, and the detection unit 22 is capable of performing detection on the table 30.

Note that the projection unit 21 and the detection unit 22 may be configured independently. In this case, the projection unit 21 and the detection unit 22 are supported separately from each other by the table 30.

The projection unit 21 is configured to separate light from a light source into red light, blue light, and green light being three primary color components, modulate, based on image data, light of the colors with liquid crystal light valves for the respective colors, synthesize the light again, magnify the light with a lens, and project the light onto the table 30.

A position, a size, or the like of a printing sample image described below, which is image data projected by the projection unit 21 onto the recording target P, is adjusted based on a printing condition. With this, the printing sample image corresponds to a printing result to be printed on the recording target P by the printing unit 12. By visually recognizing the printing sample image projected onto the recording target P, a user can simulatively recognize a printing result to be printed on the recording target P.

For example, a projection area where the projection unit 21 is capable of performing projection onto the table 30 may correspond to the size of the table 30. Alternatively, the projection area may be a range slightly smaller than the size of the table 30 in the front-and-rear direction and the right-and-left direction, that is, a range obtained by securing a predetermined margin.

Further, the control unit 10 may cause the projection unit 21 to project an icon or the like indicating a predetermined menu at a predetermined position in the projection area.

The detection unit 22 receives reflection light from the table 30. For example, the detection unit 22 is formed of a camera including a solid-state imaging element such as a Charge Coupled Device (CCD) image sensor. The detection unit 22 may include a lighting device.

Note that, when a non-light emission object such as a finger of a user is detected, the detection unit 22 may use infrared light. In this case, in addition to the lighting device that irradiates the table 30 with infrared light, a filter may be mounted to the camera. The filter transmits light having a band around that of infrared light.

The detection unit 22 is capable of detecting, as detection image data, the projection area into which the projection unit 21 is capable of performing projection. In the following description, the detection image data is simply referred to as a detection image.

The printing apparatus 1 is capable of performing wired communication or wireless communication with an external apparatus 2. Examples of the external apparatus 2 include a computer and a server. The printing apparatus 1 can receive print data and a printing condition from the external apparatus 2, and store the print data and the printing condition in the storage unit 11.

Note that the print data and the printing condition may be stored in the storage unit 11 in advance, or may be read from a storage medium by a reading device provided in the storage unit 11.

The projection unit 21 can project an icon indicating a menu, the detection unit 22 can detect a user operation with respect to the icon, and an instruction for changing the printing condition, executing printing, and the like can be received.

The printing apparatus 1 may include an input/output device such as a touch panel. A menu can be displayed on the touch panel of the printing apparatus 1, an instruction for changing the printing condition, executing printing, and the like can be received.

2. Method of Controlling Printing Apparatus

Figure 3:
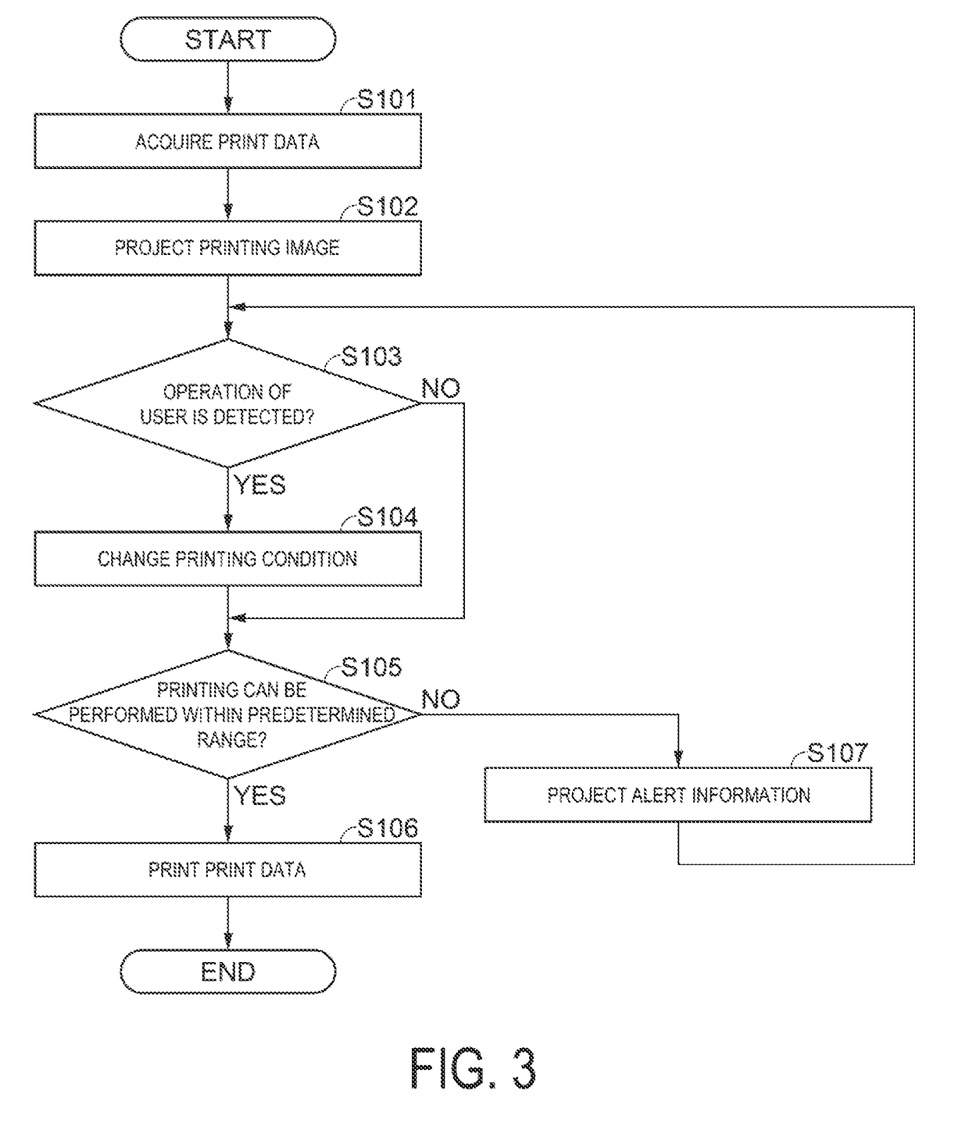
FIG. 3 is a flowchart illustrating a method of controlling the printing apparatus.
Figure 4:
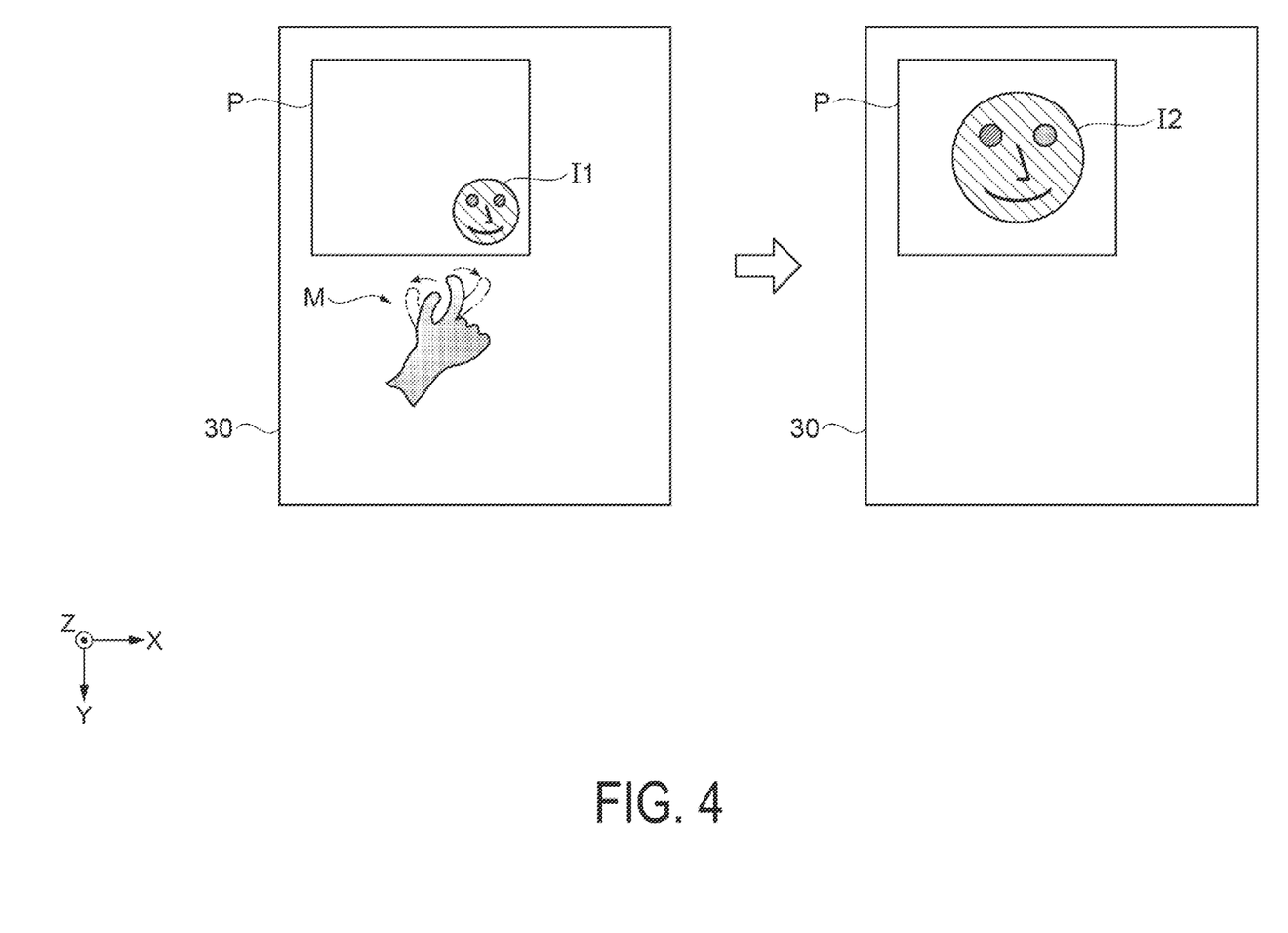
FIG. 4 is a view obtained by projecting a printing sample image when a user operation is detected, and a printing condition is changed.
Figure 5:
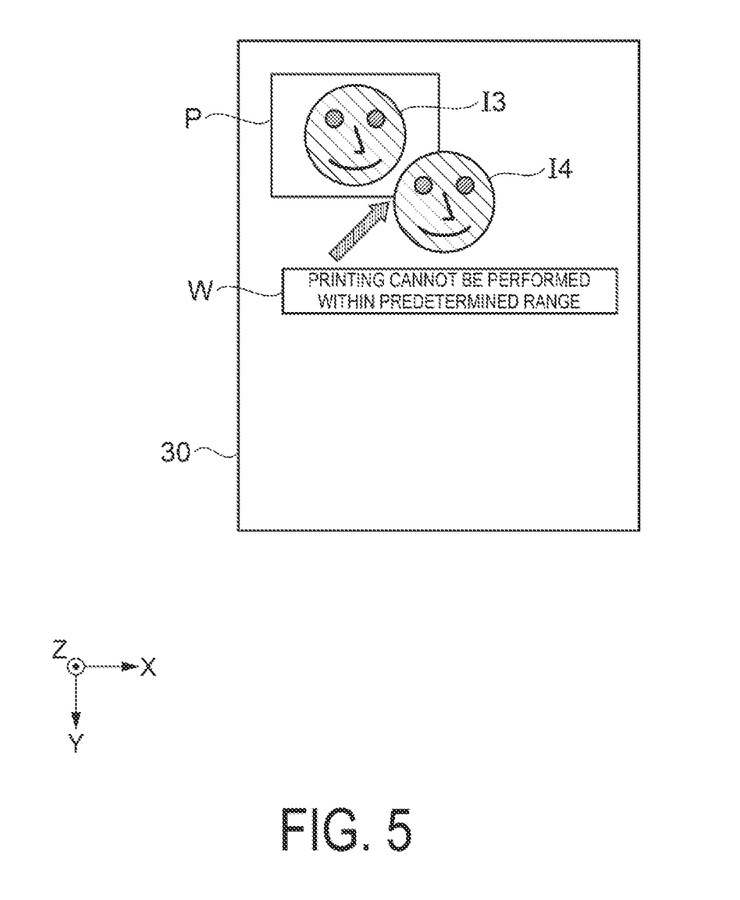
FIG. 5 is a view obtained by projecting a printing sample image and alert information when printing cannot be performed within a predetermined range.

One example of a method of controlling the printing apparatus 1 is described mainly with reference to the flowchart illustrated in FIG. 3, as well as FIG. 4 and FIG. 5.

The control unit 10 acquires the print data from the external apparatus 2, or acquires the print data from the storage unit 11 (S101). Further, the control unit 10 acquires the printing condition from the external apparatus 2, or acquires the printing condition from the storage unit 11. As described above, a change of the printing condition, which is made by a user, may be detected through the detection unit 22 of the projector 20, the touch panel, or the like.

Based on the print data and the printing condition that are acquired, the control unit 10 generates the printing sample image being image data that can be projected by the projection unit 21.

The control unit 10 causes the projection unit 21 of the projector 20 to project the generated printing sample image onto the table 30 on which the recording target P is placed (S102).

FIG. 4 and FIG. 5 illustrate results obtained when the projection unit 21 of the projector 20 projects a printing sample image I1, a printing sample image I2, a printing sample image I3, and a printing sample image I4 being generated printing sample images onto the table 30 on which the recording target P is placed.

Here, a relationship between the printing sample image generated by the control unit 10 and the print data is described in detail while giving the printing sample image I1 in the left mode in FIG. 4 as an example.

For example, the printing condition acquired by the control unit 10 is related to a position or a size of the print data at the time of performing printing on the recording target P placed on the table 30.

The storage unit 11 stores information of a coordinate in the X direction and the Y direction with the position on the table 30 as a reference. The coordinate corresponds to a storage region of a first address in which the print data is stored in the storage unit 11. As illustrated in FIG. 4 and FIG. 5, the coordinate may correspond to the X axis and the Y axis on the table 30.

Based on the position and the size designated in the printing condition, the control unit 10 stores the print data to the first address in the storage unit 11 in accordance with the coordinate.

Note that, in the following description, the storage region of the first address, and a storage region of a second address and a storage region of a third address, which are described below, in the storage unit 11 are simply referred to as the first address, the second address, and the third address, respectively. Similarly to the first address, the second address and the third address also correspond to the coordinate.

As described above, the first address in the storage unit 11 in which the print data is stored corresponds to the coordinate position on the table 30.

The control unit 10 is capable of reading the print data from the storage unit 11, causing the printing unit 12 to perform scanning to the coordinate position on the table 30 corresponding to the first address in the storage unit 11 in which the print data is stored, with the main scanning unit 13 and the sub-scanning unit 14, and ejecting the ink.

As a result, the control unit 10 is capable of causing the printing unit 12 to print the print data on the recording target P placed on the table 30 with the position and the size based on the printing condition.

The control unit 10 performs color conversion or the like based on the print data and the printing condition, thereby generating the printing sample image I1 corresponding to a printing result to be actually printed on the recording target P.

The generated printing sample image I1 is stored in the second address in the storage unit 11. As described above, the second address also corresponds to a coordinate with the position on the table 30 as a reference, and corresponds to the first address in which the print data is stored.

The control unit 10 controls the projection unit 21 of the projector 20, and reads the printing sample image I1 from the second address in the storage unit 11. With this, projection can be performed onto the position of the coordinate on the table 30 that corresponds to the second address in which the printing sample image I1 is stored.

In this manner, the control unit 10 enables projection of the printing sample image I1 onto the table 30 on which the recording target P is placed, the printing sample image I1 being obtained by reflecting the position, the size, and the like based on the printing condition.

As a result, the control unit 10 causes the projection unit 21 of the projector 20 to project the printing sample image I1 onto the table 30, and the printing sample image I1 corresponds to a printing result to be printed by the printing unit 12 in terms of a position, a size, and the like.

By visually recognizing the printing sample image I1 projected by the projection unit 21 before printing on the recording target P, a user can confirm whether the print data is to be printed on the recording target P under the target printing condition or the like.

In this case, for example, it is assumed that the user determines that the printing sample image I1 projected by the projection unit 21 is not at a target position or in a target size.

As illustrated in the left mode in FIG. 4, the user performs an operation M with respect to the printing sample image I1 projected onto the table 30. In addition to "tapping" being an action of hitting with a finger, the operation M includes "dragging" being an action of sliding while tapping, "swiping" being an action of flicking with a finger in a different direction from a tapped position, "pinching in" and "pinching out" being actions of magnification and reduction during a touching action with two fingers, and the like.

Here, detection of the operation M of the user, which is performed by the detection unit 22 of the projector 20, is described in detail.

The detection unit 22 detects the detection image on the table 30 at a predetermined interval. The control unit 10 stores the detection image, which is detected by the detection unit 22, in the third address in the storage unit 11. In the following description, a detection image that is firstly detected by the detection unit 22 is referred to as a former detection image, and a detection image that is subsequently detected is referred to as a latter detection image.

As described above, the first address in which the print data is stored, the second address in which the printing sample image I1 is stored, and the third address in which the detection image is stored in the storage unit 11 correspond to the respective coordinates on the table 30. Specifically, as illustrated in FIG. 4 and FIG. 5, the coordinates correspond to the X axis and the Y axis on the table 30. As a result, the print data, the printing sample image, and the detection image can be associated to one another.

The control unit 10 successively performs comparison between the former detection image detected by the detection unit 22 and the latter detection image.

For example, when a user places their finger on the table 30, the control unit 10 performs comparison between the former detection image without the finger of the user and the latter detection image with the finger of the user, thereby determining that the user places their finger on the table 30.

Moreover, the control unit 10 is capable of determining the position of the finger of the user with respect to the table 30, based on the coordinate on the table 30 corresponding to the third address in the storage unit 11 in which the detection image is stored.

Similarly, the control unit 10 is capable of determining, based on the detection image with the operation M of the user detected by the detection unit 22, the operation M of another user.

For example, it is assumed that the user performs "tapping" being an action of hitting with their finger on the printing sample image projected by the projection unit 21.

The control unit 10 performs comparison between the former detection image without the finger of the user, which is detected by the detection unit 22 before the user hits their finger on the printing sample image, and the latter detection image with the finger of the user on the printing sample image, which is detected after the user hits their finger on the printing sample image. The control unit 10 also refers to the coordinate on the table 30 corresponding to the third address in the storage unit 11, thereby determining that the user hits their finger at the position of the printing sample image. As a result, the control unit 10 is capable of determining that the user performs "tapping" on the printing sample image.

For example, it is assumed that the user performs "dragging" being an action of sliding while "tapping" on the printing sample image projected by the projection unit 21.

The control unit 10 performs comparison between the former detection image with the finger of the user at the "tapped" position before "dragging" and the latter detection image with the finger of the user at the position after "dragging", and also refers to the coordinates on the table 30. With this, the control unit 10 is capable of determining "dragging" of the finger of the user and the moving amount on the printing sample image.

For example, it is assumed that the user hits two of their fingers on the printing sample image projected by the projection unit 21.

The control unit 10 performs comparison between the former detection image without the two fingers of the user on the printing sample image and the latter detection image with the two fingers of the user on the printing sample image, and also refers to the coordinates on the table 30. With this, the control unit 10 is capable of determining that the two fingers of the user are present at the position on the printing sample image.

Moreover, it is assumed that the user subsequently performs "pinching in" and "pinching out" being actions of magnification and reduction on the printing sample image with the two fingers of the user.

The control unit 10 performs comparison between the former detection image obtained when the user hits the two fingers on the printing sample image and the latter detection image obtained when the two fingers are away from each other or closer to each other while the user hits the two fingers on the printing sample image, and also refers to the coordinates on the table 30. With this, the control unit 10 is capable of determining "pinching in" and "pinching out" of the fingers of the users and the moving amount on the printing sample image.

When the user terminates the above-mentioned operation M, and lifts the finger off from the table 30, the control unit 10 performs comparison between the former detection image with the finger of the user performing the operation M and the latter detection image without the finger of the user. As a result, the control unit 10 is capable of determining that the finger of the user is no longer present on the table 30 and determining that the user terminates the operation M.

The control unit 10 may cause the projection unit 21 to project, at a predetermined position on the table 30, an icon or the like indicating a menu for changing the position and the size of the printing sample image or the like. Similarly to the description given above, the detection unit 22 detects the operation M of the user on the icon, and thus the control unit 10 is capable of determining the operation M of the user. The control unit 10 is capable of changing the position and the size of the printing sample image, in accordance with the operation M of the user on the icon.

Note that the detection unit 22 may also include a part of the functions of the control unit 10 and may directly determine the operation M of the user, the moving amount, and the like.

Again, with reference to FIG. 3, the description is continued. The control unit 10 determines that the detection unit 22 detects the operation M of the user (YES in S103). Specifically, the control unit 10 causes the detection unit 22 to determine the operation M of the user such as "tapping", "dragging", "pinching in", and "pinching out", the moving amount, and the like on the printing sample image projected onto the table 30.

For example, based on the operation M of the user, the moving amount, or the like, the control unit 10 changes the printing condition such as a position and a size from the printing sample image I1 in the left mode in FIG. 4 (S104). Subsequently, the printing sample image 12 as in the right mode in FIG. 4 is generated and projected by the projection unit 21.

Note that, when the control unit 10 determines not to detect the operation M of the user (NO in S103), the printing condition is not changed.

For example, based on information relating to the position of the printing sample image I1 that is moved by "dragging" or information relating to the size of the printing sample image I1 magnified by "pinching in", the control unit 10 changes the printing condition stored in the storage unit 11. Based on the above-mentioned printing condition that is changed based on the operation M of the user, the control unit 10 changes and stores the print data in the storage unit 11, and enables printing with the printing unit 12. Note that, as illustrated in FIG. 4, the changed print data corresponds to the printing sample image 12 that is changed from the printing sample image I1.

Here, predetermined range information for printing is described. Hereinafter, the predetermined range information is simply referred to as a predetermined range. For example, the predetermined range is information indicating a range of the recording target P placed on the table 30.

Note that the predetermined range may be changed by a user through the touch panel of the printing apparatus 1. Alternatively, a change may be made by a user through the operation M. Based on the operation M of the user that is detected by the detection unit 22, the control unit 10 is capable of changing the predetermined range. When, as described above, the range of the recording target P is set to the predetermined range, the control unit 10 may set the range of the recording target P that is extracted from the detection image.

The control unit 10 associates the changed predetermined range with the coordinate on the table 30, and stores the range in the storage unit 11.

The control unit 10 determines whether the print data can be printed within the predetermined range (S105). The processing performed by the control unit 10 is described in detail.

The printing sample image that is projected by the projection unit 21 onto the recording target P corresponds to the print data that is printed by the printing unit 12 on the recording target P. Therefore, for example, when the control unit 10 determines whether the print data can be printed within the predetermined range, determination may be performed by using the printing sample image instead of the print data. As described below, when determination is performed by using the printing sample image, the control unit 10 may cause the projection unit 21 to appropriately project an alert information W being overlapped with the printing sample image in accordance with the determination result.

Description is made on the printing sample image 13 and the printing sample image 14 in FIG. 5, which are projected by the projection unit 21, as an example.

While referring to the second address in the storage unit 11, the control unit 10 acquires the position and the size of the printing sample image 13 in the coordinate on the table 30. The control unit 10 reads the predetermined range in the coordinate on the table 30 from the storage unit 11.

The control unit 10 is only required to determine whether, in the coordinate on the table 30, the position and the size of the printing sample image 13 are within the predetermined range. As a result, the control unit 10 is also capable of determining whether the print data can be printed within the predetermined range. Similarly, the control unit 10 is capable of performing determination also for the printing sample image 14.

The predetermined range read from the storage unit 11 corresponds to the range of the recording target P. As illustrated in FIG. 5, the printing sample image 13 projected by the projection unit 21 is within the range of the recording target P. Therefore, the control unit 10 is capable of determining that the printing sample image 13 stored in the storage unit 11 is within the range of the recording target P and determining that the print data corresponding to the printing sample image 13 can be printed within the range of the recording target P.

Meanwhile, as illustrated in FIG. 5, at least a part of the printing sample image 14 projected by the projection unit 21 is not included within but protrudes from the range of the recording target P. Therefore, the control unit 10 is capable of determining that at least a part of the printing sample image 14 stored in the storage unit 11 is not included within but protrudes from the range of the recording target P. As a result, the control unit 10 is capable of determining that the print data corresponding to the printing sample image 14 cannot be printed within the range of the recording target P.

Note that, while referring to the first address in the storage unit 11, the control unit 10 may acquire the position and the size of the print data in the coordinate on the table 30, and may directly determine whether the print data is within the predetermined range in the coordinate on the table 30.

When it is determined that the print data corresponding to the printing sample image 14 cannot be printed within the range of the recording target P being the predetermined range (NO in S105), the control unit 10 causes the projection unit 21 to perform projection together with the overlapping alert information W (S107), as illustrated in FIG. 5. For example, the alert information W is information indicating that the printing sample image 14 cannot be printed within the range of the recording target P. Note that the alert information W is stored in the storage unit 11.

As illustrated in FIG. 5, the control unit 10 performs projection of the alert information W pointing out, with an arrow, the part of the printing sample image 14 that is not included within but protrudes from the range of the recording target P. The alert information W contains information of the arrow illustrated in FIG. 5, the information pointing out the part of the printing sample image 14 that is not included in the range of the recording target P. Note that the control unit 10 does not perform projection of the alert information W for the printing sample image 13 that is within the range of the recording target P and does not protrude therefrom. Then, the control unit 10 returns to the processing for determining whether the detection unit 22 detects the operation M of the user (S103).

By visually recognizing the printing sample image 14 indicated with the alert information W and the arrow illustrated in FIG. 5, the user can recognize that the print data corresponding to the printing sample image 14 cannot be printed within the range of the recording target P. Meanwhile, the user can recognize that the print data corresponding to the printing sample image 13 can be printed within the range of the recording target P.

In view of this, the user attempts to position the printing sample image 14, which protrudes from the range of the recording target P, within the range of the recording target P. The user performs the operation M of "dragging" for positioning the projected printing sample image 14 within the range of the recording target P.

The control unit 10 determines that the detection unit 22 detects the operation M of "dragging" of the user (YES in S103).

The control unit 10 generates, based on the operation M of "dragging" of the user detected by the detection unit 22, the printing sample image 14 by positioning the printing sample image 14, which protrudes from the range of the recording target P, within the range of the recording target P, and causes the projection unit 21 to project the resultant.

Note that, in some cases, the user attempts to change the size so that the printing sample image 14 is within the range of the recording target P. In this case, the user performs the operation M of "pinching out" being an action of reduction with the two fingers so as to position the printing sample image 14, which protrudes from the range of the recording target P, within the range of the recording target P. The control unit 10 determines that the detection unit 22 detects the operation M of "pinching out" (YES in S103).

The control unit 10 reduces, based on the detected operation M of "pinching out" of the user, the printing sample image 14 protruding from the range of the recording target P to the size within the range of the recording target P, and causes the projection unit 21 to project the resultant.

In this manner, the printing sample image 14 that is changed based on the operation M of the user is within the range of the recording target P. Based on information relating to the position of the printing sample image 14 that is moved by "dragging" or information relating to the size of the printing sample image 14 reduced by "pinching out", the control unit 10 changes the printing condition stored in the storage unit 11 (S104).

The control unit 10 is capable of determining that the changed printing sample image 14 is within the range of the recording target P and determining that the print data corresponding to the printing sample image 14 can be printed within the range of the recording target P.

Therefore, the control unit 10 is capable of determining that the print data corresponding to the printing sample image 13 and the printing sample image 14 can be printed within the range of the recording target P being the predetermined range (YES in S105).

Based on the changed printing condition, the control unit 10 changes the print data corresponding to the printing sample image 14 in the first address of the storage unit 11, in terms of the position and the size. The control unit 10 controls the printing unit 12, the main scanning unit 13, and the sub-scanning unit 14, based on the changed printing condition, thereby printing the print data corresponding to the printing sample image 13 and the printing sample image 14 within the range of the recording target P (S106).

Note that, when the printing condition is not changed, the control unit 10 is only required to control the printing unit 12 and the like, based on the original printing condition stored in the storage unit 11, thereby printing the print data corresponding to the original printing sample image 13 and the original printing sample image 14.

As described above, the control unit 10 can cause the projection unit 21 to project the printing sample image onto the recording target P, cause the detection unit 22 to detect the operation M of the user, change the printing condition such as a position and a size, and cause the printing unit 12 to perform printing on the recording target P.

A user can recognize a printing result to be printed on the recording target P in advance by visually recognizing the printing sample image projected onto the recording target P, and can easily change a printing condition by performing the operation M. With this, printing can be performed as intended.

Those exemplary embodiments are described in detail with reference to the drawings. However, the specific configurations are not limited to those exemplary embodiments, and may be modified, replaced, or deleted without departing from the gist of the present disclosure.

For example, in the example given above, the ink ejected from the printing unit 12 of the printing apparatus 1 is ultraviolet light curable ink, but may be other than ultraviolet light curable ink. The colors of the ink may include light colors and deep colors of C, M, Y, and K, and may include colors other than C, M, Y, and K.

What is claimed is:

1. A printing apparatus, comprising:
a printing unit including a print head and configured to perform printing on a recording target;
a projection unit configured to project a printing sample image onto the recording target;
a detection unit configured to detect image including a part of a body of a user, who uses the printing apparatus, in an area between the projection unit and the recording target; and
a control unit including a processor that is configured to control the printing unit based on a printing condition,
the control unit being further configured to determine, based on the image detected by the detection unit, a gesture of the user, and change the printing condition based on the gesture of the user, wherein
the projection unit is configured to project the printing sample image corresponding to print data when printing is performed by the printing unit on the recording target, and
in a case in which a detection image detected by the detection unit includes the printing sample image, when the detection image does not include at least a part of the printing sample image in a range of the recording target, the control unit causes the projection unit to project alert information.

2. The printing apparatus according to claim 1, wherein the printing condition is related to a position or a size at which the printing unit performs printing on the recording target.

3. The printing apparatus according to claim 1, wherein the alert information includes information indicating a part, of the printing sample image, that is not included in the range of the recording target.

4. The printing apparatus according to claim 1, comprising:
a table on which the recording target is placed,
a scanning unit including a carriage and configured to cause the printing unit to perform scanning with respect to the table, wherein
the projection unit is configured to project the printing sample image onto the recording target, placed on the table, and
the detection unit is configured to detect the detection image including the printing sample image.

5. The printing apparatus according to claim 1, further comprising:
a projector, wherein
the projector includes the projection unit and the detection unit.

6. The printing apparatus according to claim 3, further comprising
a table on which the recording target is placed, wherein
the projection unit faces toward the table, and
the detection unit faces toward the table.

7. A method of controlling a printing apparatus, the printing apparatus including:
a printing unit including a print head and configured to perform printing on a recording target, based on a printing condition;
a projection unit configured to project a printing sample image onto the recording target, the projection unit being configured to project the printing sample image corresponding to print data when printing is performed by the printing unit on the recording target, and
a detection unit configured to detect image including a part of a body of a user, who uses the printing apparatus, in an area between the projection unit and the recording target,
the method comprising:
determining, based on the image detected by the detection unit, a gesture of the user;
changing the printing condition based on the gesture of the user, and
projecting alert information by the projection unit, in a case in which a detection image detected by the detection unit includes the printing sample image, when the detection image does not include at least a part of the printing sample image in a range of the recording target.

8. The method according to claim 7, wherein
the printing apparatus further includes a table on which the recording target is placed,
the projection unit faces toward the table, and
the detection unit faces toward the table.

9. The printing method according to claim 7, wherein
the alert information includes information indicating a part, of the printing sample image, that is not included in the range of the recording target.

10. The printing method according to claim 7, wherein the printing apparatus further includes
a table on which the recording target is placed,
a scanning unit including a carriage and configured to cause the printing unit to perform scanning with respect to the table,
the projection unit is configured to project the printing sample image onto the recording target, placed on the table, and
the detection unit is configured to detect the detection image including the printing sample image.

* * * * *